April 7, 1964     L. W. TEWELES     3,128,035
PLASTIC HANDLE FOR PLASTIC BAG
Filed Sept. 20, 1961
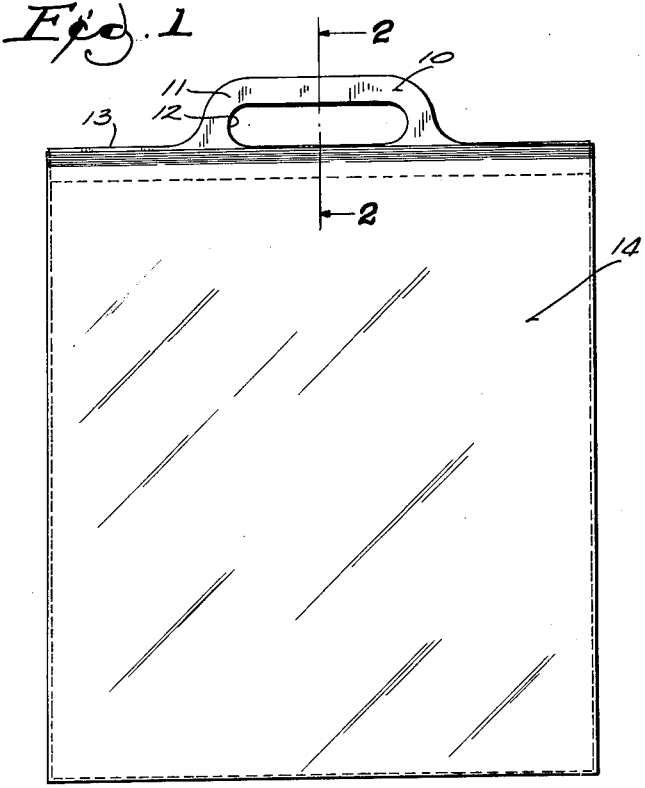
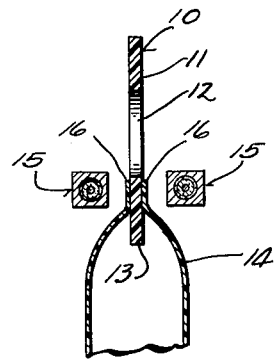
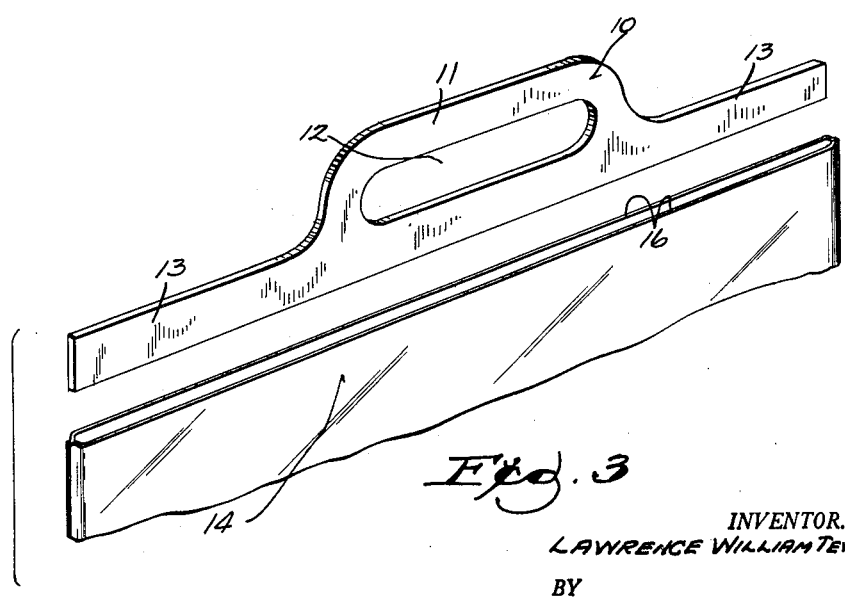
INVENTOR.
LAWRENCE WILLIAM TEWELES
BY
Wheeler, Wheeler & Wheeler
ATTORNEYS

United States Patent Office 3,128,035
Patented Apr. 7, 1964

3,128,035
PLASTIC HANDLE FOR PLASTIC BAG
Lawrence W. Teweles, 8365 N. Pelican Lane,
Milwaukee, Wis.
Filed Sept. 20, 1961, Ser. No. 139,452
1 Claim. (Cl. 229—54)

This invention relates to a plastic carrying handle for plastic bags.

The object of the invention is to provide a handle for plastic bags which is inexpensive, is readily applied, and is more serviceable and durable than those previously in use. A further object is to provide a handle for a plastic bag which is neater and more attractive than those previously used.

According to the present invention the handle member comprises a heat sealable plastic member having a base portion which is long enough to extend across the opening of the plastic bag and which is substantially flat. It is applied to the bag by placing it in the opening and then heat sealing the opening in the usual manner. The handle member is relatively stiff compared to the bag, at least in the plane in which the bag hangs from the handle, and for this purpose may be fabricated from chemically similar material thicker than the bag, or of greater density and rigidity than that of the bag, or both.

This structure provides support for the bag which extends uniformly across the entire top of the bag, rather than being concentrated at a few points as is the case with a stapled handle such as in common use, and it is simple to manufacture and apply in comparison with cardboard handles which conventionally must be folded to provide several thicknesses in order to obtain the necessary stiffness. In addition, the procedures required to attach cardboard handles to the bag are more complex than that of the instant invention, take more time, require more different kinds of supplies, and give a less attractive final result.

FIG. 1 is a plane view of a plastic bag showing the handles of my invention.

FIG. 2 is a cross-sectional view on line 2—2 of FIG. 1 showing heat sealing bars in position to effect the bonding of the handles to the bag and the closure of the bag.

FIG. 3 is an exploded view showing the handle and the bag as they appear just prior to application of the handle.

As shown in the drawings, the handle member 10 of my invention consists of a hand grip portion 11 in which there is an opening 12 to receive the fingers, and which may also be used to receive an arm extending from a display rack. Handle member 10 further comprises a base portion 13 which has substantially the same horizontal extent as the lateral dimension of a plastic bag 14 to which the handle is to be applied. The handle is secured to the bag by heat sealing. Applicant has found that a low density polyethylene bag and a medium density polyethylene handle are suitable materials for use in the invention, although other materials are also usable. These materials are readily heat sealable on standard heat sealing equipment such as the bars shown schematically at 15 in FIG. 2.

Handle 10 may be applied to bag 14 either while the bag is empty or after it has been filled. As shown in FIG. 2 the bag is already filled. The edges 16 of the bag have been brought together on the sides of base 13 of the handle in preparation for the application of heat sealing bars 15. As shown in FIG. 3 the bag is empty and accordingly the sides lie flat. If the contents of the bag will be so bulky that it is difficult to handle when filled, the handle may be applied prior to heat sealing the bottom seam, and the final closure of the bag may be made at that seam after filling the bag.

Since the addition of the handle of my invention to a plastic bag does not require any additional operations over those which would be required to close the bag in any case, it is easy to use and very economical. The precise shape of the handle is not important as long as it has a flat surface substantially as long as one side of the bag. It could, for instance, be generally rectangular in outline with space for advertising material at each side of the opening which receives the fingers, or it could be the shape of the product. Likewise, the area which is heat sealed is dependent solely on the requirements imposed by the weight and size of the contents of the bag, and the stress is thus distributed as much as necessary rather than being concentrated at a few points by the staples of the prior art.

I claim:

A heat-sealable bag having a pair of separate coextensive sides provided with free edges, a handle for said bag composed of a single thickness of heat-sealable material which is very stiff and tough relative to the material of said bag, said handle being provided with an integral base portion between said free edges and substantially coextensive therewith, and a handle loop integral with said base portion, said handle loop having a portion spaced from said base portion to form an opening extending longitudinally of said base portion for approximately one-half of the longitudinal extent of said base portion, said free edges of said sides being heat sealed to the base portion of said handle, those edges of the said separate sides which are not heat sealed to the base portion of said handle being heat sealed to each other, said base member having sufficient rigidity in the plane of said sides to support the contents of the bag without further attachment to the bag, said bag being low density polyethylene film and said handle being medium density polyethylene sheet.

References Cited in the file of this patent

UNITED STATES PATENTS

| | | |
|---|---|---|
| 1,733,219 | Duvall | Oct. 29, 1929 |
| 2,369,716 | Coghill | Feb. 20, 1945 |
| 3,008,837 | Kaplan | Nov. 14, 1961 |
| 3,015,918 | Schoen | Jan. 9, 1962 |
| 3,097,788 | Nichols | July 16, 1963 |